United States Patent
Tuppen et al.

(10) Patent No.: US 8,496,990 B2
(45) Date of Patent: Jul. 30, 2013

(54) METHOD OF REPAIRING A COATING ON AN ARTICLE

(75) Inventors: Stephen J. Tuppen, Derby (GB); Daniel Clark, Derby (GB); Alan S. Wood, Derby (GB)

(73) Assignee: Rolls-Royce PLC, London (GB)

( * ) Notice: Subject to any disclaimer, the term of this patent is extended or adjusted under 35 U.S.C. 154(b) by 602 days.

(21) Appl. No.: 12/461,017

(22) Filed: Jul. 29, 2009

(65) Prior Publication Data

US 2010/0062180 A1 Mar. 11, 2010

(30) Foreign Application Priority Data

Sep. 8, 2008 (GB) .................................. 0816257.0

(51) Int. Cl.
*B05D 3/00* (2006.01)
(52) U.S. Cl.
USPC .......................................... 427/142; 427/554
(58) Field of Classification Search
USPC ......... 427/140, 142, 532, 533, 554; 29/889.1;
228/119, 101, 227, 231, 232
See application file for complete search history.

(56) References Cited

U.S. PATENT DOCUMENTS

| | | | | |
|---|---|---|---|---|
| 6,637,643 B2 * | 10/2003 | Hasz et al. | ..................... | 228/119 |
| 6,652,925 B1 * | 11/2003 | Schwarz et al. | .............. | 427/595 |
| 2006/0093752 A1 * | 5/2006 | Darolia et al. | ................. | 427/523 |

FOREIGN PATENT DOCUMENTS

| | | |
|---|---|---|
| DE | 199 06 765 A1 | 8/2000 |
| DE | 10 2006 028 297 A1 | 12/2007 |
| EP | 1 091 020 A1 | 4/2001 |
| EP | 1 256 635 A1 | 11/2002 |
| EP | 1 288 330 A1 | 3/2003 |
| EP | 1 304 446 A1 | 4/2003 |
| EP | 1 881 154 A1 | 1/2008 |
| GB | 1 508 473 | 4/1978 |
| WO | WO 2005/056877 A1 | 6/2005 |

OTHER PUBLICATIONS

European Search Report for corresponding European Patent Application No. 09251899, dated Oct. 29, 2010.

* cited by examiner

*Primary Examiner* — Dah-Wei Yuan
*Assistant Examiner* — Nga Leung V Law
(74) *Attorney, Agent, or Firm* — Oliff & Berridge, PLC (57) ABSTRACT

A method of locally repairing a coating (50) on a gas turbine engine nozzle guide vane (26) or a turbine blade (30,30B) comprises removing a damaged portion of the coating (50) from a portion (53) of the article. Any oxidized layer (54) is removed from the portion (53) of the surface of the article. Material is placed on the portion (53) of the article (26,30, 30B) to form a patch coating (50B). The material is heated to form a patch coating (50B) on the portion (53) of the article (26,30,30B) and to bond the patch coating (50B) to the portion (53) of the article (26,30,30B) and to the coating surrounding the patch coating (50B). A high energy beam is impinged on the coating (50) and the high energy beam is moved from the periphery (60) of the patch coating (50B) to the periphery (62) of the coating (50) in a pattern (P) to uniformly heat the periphery (60) of the patch coating (50B) and the periphery (62) of the coating (50). The advantage is that a halo effect around the patch coating (50B) is obviated.

26 Claims, 4 Drawing Sheets

METHOD OF REPAIRING A COATING ON AN ARTICLE

The present invention relates to a method of repairing a coating on an article and in particular to a method of locally repairing a coating on a gas turbine engine component.

Gas turbine engine components, e.g. turbine blades, combustor nozzle guide vanes and turbine vanes, are generally provided with nickel aluminide coatings to provide high temperature oxidation resistance for the gas turbine engine components. In particular the gas turbine engine components comprise a nickel base superalloy substrate, which is provided with a nickel aluminide intermetallic coating. The nickel aluminide intermetallic coating is produced by depositing aluminium onto the surface of the nickel base superalloy substrate and inter-diffusing the aluminium and the nickel at the surface of the nickel base superalloy substrate, this process is known as aluminising. The aluminising process aims to produce a nickel aluminide intermetallic, a beta nickel aluminide NiAl. The aluminising process may be pack aluminising, slurry aluminising, out of pack vapour aluminising or chemical vapour deposition.

However, after service in a gas turbine engine it is necessary to repair damaged gas turbine engine components, e.g. turbine blades, combustor nozzle guide vanes and turbine blades, to enable them to be re-used in the gas turbine engine.

One method of repairing gas turbine engine components comprises removing all of the nickel aluminide coating from the gas turbine engine component, removing oxidation from the surface of the gas turbine engine component, repairing the gas turbine engine component and depositing a nickel aluminide coating on the gas turbine engine component. However, this method of repair is costly and time consuming and removes and replaces the nickel aluminide coating at portions of the gas turbine engine component where it is not necessary to remove the nickel aluminide coating.

A further method of repairing gas turbine engine components comprises removing the nickel aluminide coating from a localised portion of the gas turbine engine component, removing oxidation from the localised portion of the surface of the gas turbine engine component, repairing the localised portion of the gas turbine engine component and depositing a nickel aluminide coating on the localised portion of the gas turbine engine component. The nickel aluminide is deposited locally by providing a tape of aluminium and a halogen salt flux and locally heating to aluminise the localised portion of the gas turbine engine component.

A problem with the aluminising of a localised portion of the surface of the gas turbine engine component is that some of the aluminium may diffuse into the adjacent undamaged nickel aluminide coating. This additional aluminising of the adjacent undamaged nickel aluminide coating results in an increase in the concentration of aluminium in the undamaged nickel aluminide coating and this increases the risk of forming brittle aluminium rich phase, $NiAl_3$. This over aluminising around the localised portion of the gas turbine engine component produces a "halo" or "ring" in the undamaged nickel aluminide coating which has a high aluminium concentration.

Accordingly the present invention seeks to provide a novel method of locally repairing an aluminide coating on an article which reduces, preferably overcomes, the above mentioned problem.

Accordingly the present invention provides a method of locally repairing a coating on an article comprising the steps of:

a) removing a damaged portion of a coating from a portion of the article,
b) removing any oxidised layer from the portion of the article,
c) placing material to form a patch coating on the portion of the article,
d) heat treating the material to form a patch coating on the portion of the article and to bond the patch coating to the portion of the article and to the coating adjacent to the patch coating, and
e) impinging a high energy beam on the coating and moving the high energy beam from the periphery of the patch coating to the periphery of the coating adjacent to the patch coating to uniformly heat the periphery of the patch coating and the periphery of the coating adjacent to the patch coating.

Preferably the method comprises moving the high energy beam from the periphery of the patch coating to the periphery of the coating adjacent to the patch coating in a zig-zag pattern or moving the high energy beam from the periphery of the patch coating adjacent to the patch coating to the periphery of the coating to form a cross-hatch pattern.

Preferably the high energy beam is a laser beam.

The coating may comprise nickel aluminide and step c) comprises placing stoichiometric amounts of nickel and aluminium only to produce a nickel aluminide patch coating. Step c) may comprise placing stoichiometric amounts of nickel powder and aluminium powder on the portion of the article. Step c) may comprise placing nickel aluminide powder on the portion of the article.

Step c) may comprise placing at least one foil onto the portion of the article, the foil comprising pre-sintered nickel aluminide powder or pre-sintered nickel and aluminium powders.

Preferably step c) comprises placing 40 to 60 at % nickel and 60 to 40 at % aluminium to produce the nickel aluminide patch. More preferably step c) comprises placing 45 to 55 at % nickel and 55 to 45 at % aluminium to produce the nickel aluminide patch. In particular step c) comprises placing 50 at % nickel and 50 at % aluminium to form the nickel aluminide patch.

Alternatively the coating may comprise platinum aluminide and step c) comprises placing stoichiometric amounts of platinum, nickel and aluminium to produce a platinum aluminide patch coating. Step c) may comprise placing stoichiometric amounts of platinum powder, nickel powder and aluminium powder on the portion of the article. Step c) may comprise placing platinum aluminide powder on the portion of the article. Step c) may comprise placing at least one foil onto the portion of the article, the foil comprising pre-sintered platinum aluminide powder or pre-sintered platinum, nickel and aluminium powders.

Alternatively step c) comprises placing up to 30 at % nickel, 50 to 20 at % platinum and 40 to 60 at % aluminium and 60 to 40 at % aluminium to form the platinum aluminide patch. More preferably step c) comprises placing up to 25 at % nickel, 25 to 50 at % platinum and 44 to 55 at % aluminium to form the platinum aluminide patch. In particular step c) comprises placing 25 at % nickel, 25 at % platinum and 50 at % aluminium to form the platinum aluminide patch.

Step c) may comprise blowing the at least one foil onto the portion of the article.

Step c) may comprise placing a first foil onto the portion of the article and placing at least one further foil onto the first foil.

Step c) may comprise placing a plurality of further foils onto the first foil and each further foil is placed on a foil.

Preferably step d) comprises locally heat treating the material to form the patch coating on the portion of the article and to bond the patch coating to the portion of the article and to the coating surrounding the patch coating.

Preferably the local heat treating comprises providing a heating device, the heating device comprising an enclosure which extends over the portion of the article, the enclosure comprising nozzles to direct hot gas jets onto the portion of the article.

Preferably the article comprises a gas turbine engine component.

Preferably the gas turbine engine component comprises a turbine vane, a turbine blade, a combustor nozzle guide vane or a turbine blisk.

The present invention will be more fully described by way of example with reference to the accompanying drawings in which.

Figure 1:
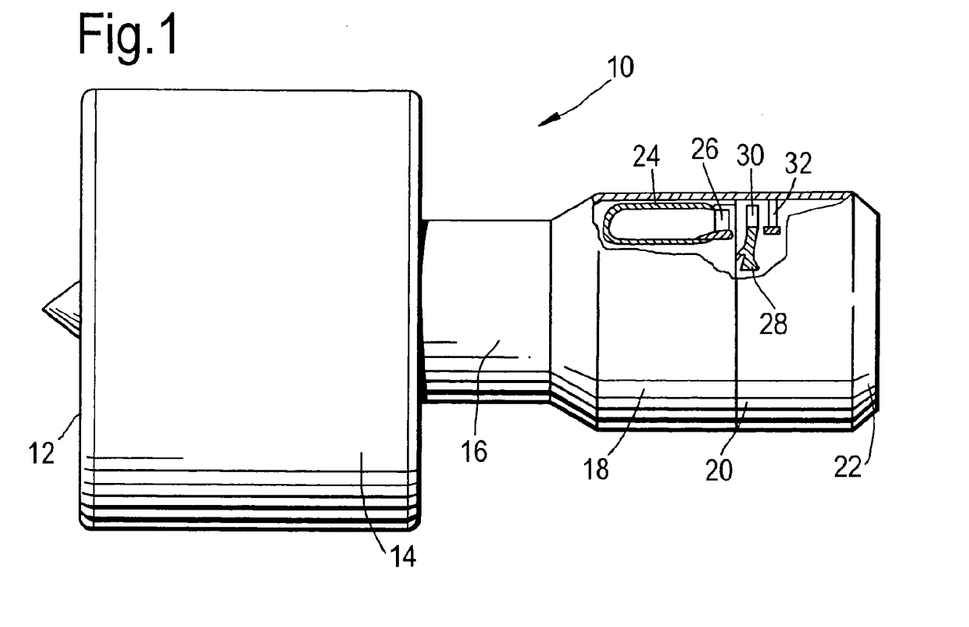
FIG. 1 shows a turbofan gas turbine according having an article with a nickel aluminide coating repaired according to the present invention.

A turbofan gas turbine engine 10, as shown in FIG. 1, comprises in flow series an intake 12, a fan section 14, a compressor section 16, a combustor section 18, a turbine section 20 and an exhaust 22. The fan section 14 comprises a fan. The compressor section 16 comprises an intermediate pressure compressor and a high pressure compressor arranged in flow series. The turbine section 20 comprises a high pressure turbine, an intermediate pressure turbine and a low pressure turbine arranged in flow series. The high pressure turbine is arranged to drive the high pressure compressor. The intermediate pressure turbine is arranged to drive the intermediate pressure compressor and the low pressure turbine is arranged to drive the fan in the fan section 14.

In operation air is compressed as it flows sequentially through the fan in the fan section 14 and the intermediate pressure compressor and the high pressure compressor in the compressor section 16. The compressed air is supplied to a combustor 24 in the combustor section 18, where fuel is burnt to produce hot gases. The hot gases flow sequentially through the high pressure turbine, the intermediate pressure turbine and the low pressure turbine in the turbine section 20.

Figure 2:
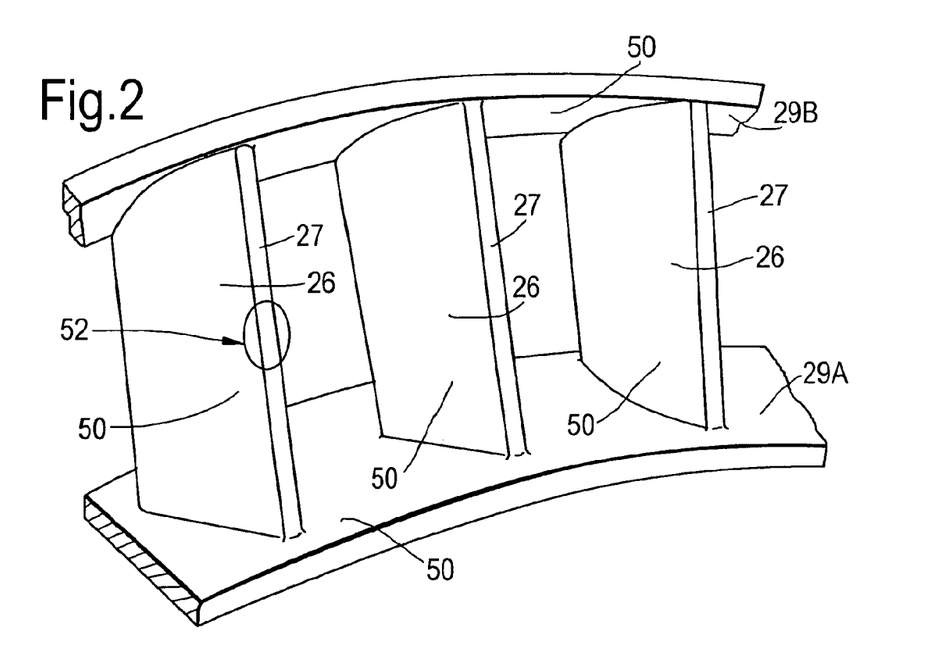
FIG. 2 is a perspective view of a combustor nozzle guide vane assembly with a nickel aluminide coating repaired according to the present invention.

The combustor 24 has a nozzle guide vane assembly 26, a portion of which is shown more clearly in FIG. 2. The high pressure turbine comprises a turbine disc 28 and a plurality of circumferentially spaced radially extending turbine blades 30, as shown more clearly in FIGS. 3 and 4. The high pressure turbine also comprises a plurality of turbine vanes 32 positioned downstream of the turbine blades 30.

FIG. 2 shows three of the nozzle guide vanes 26 and in particular the leading edges 27 of the nozzle guide vanes 26. The nozzle guide vanes 26 have radially inner platforms 29A and radially outer platforms 29B. The nozzle guide vanes 26 are provided with a nickel aluminide coating 50 on the gas washed surfaces of the nozzle guide vanes 26 and the gas washed surfaces of the radially inner and radially outer platforms 29A and 29B. A damaged portion 52 of the nickel aluminide coating 50 is shown at the leading edge 27 of one of the nozzle guide vanes 26.

Figure 3:
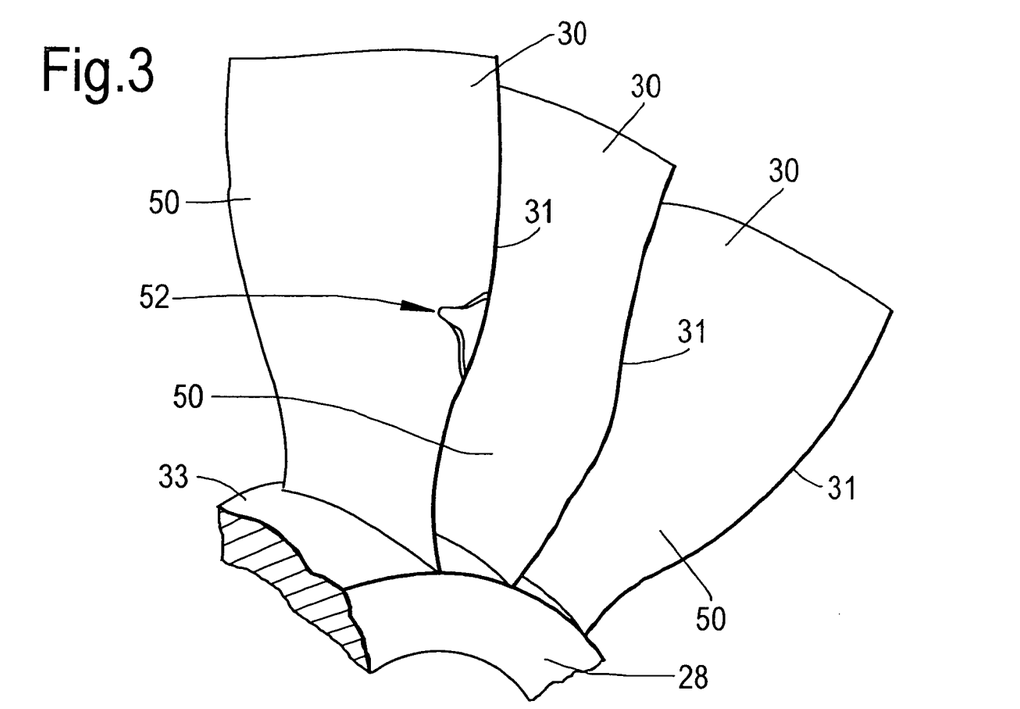
FIG. 3 is a perspective view of a turbine blisk with a nickel aluminide coating repaired according to the present invention.

FIG. 3 shows three turbine blades 30 and in particular the leading edges 31 of the turbine blades 30. In this arrangement the turbine blades 30 are integral with the turbine disc 28 to form a turbine blisk, turbine bling or turbine blum. The turbine disc 28 has a radially outer surface 33 located circumferentially between adjacent turbine blades 30. The turbine blades 30 are provided with a nickel aluminide coating 50 on the gas washed surfaces of the turbine blades 30 and the gas washed radially outer surface 33 of the turbine disc 28. A damaged portion 52 of the nickel aluminide coating 50 is shown at the leading edge 31 of one of the turbine blades 30.

Figure 4:
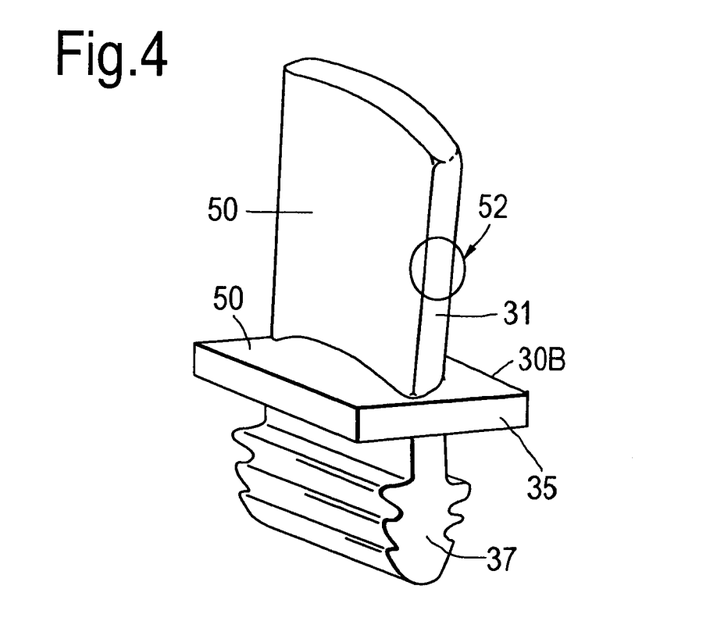
FIG. 4 is a perspective view of a turbine blade with a nickel aluminide coating repaired according to the present invention.

FIG. 4 shows one turbine blade 30B and in particular the leading edge 31 of the turbine blade 30B. In this arrangement the turbine blade 30B is separate to the turbine disc 28. The turbine blade 30B comprises a radially inner platform 35 and a firtree root 37. The firtree root 37 of each turbine blade 30B is arranged to locate in a corresponding one of a plurality of correspondingly shaped firtree slots in the periphery of the turbine disc 28, as is well known to those skilled in the art. The turbine blades 30B are provided with a nickel aluminide coating 50 on the gas washed surfaces of the turbine blades 30 and the gas washed surfaces of the radially inner platform 35. A damaged portion 52 of the nickel aluminide coating 50 is shown at the leading edge 31 of one of the turbine blades 30B.

Figure 5:
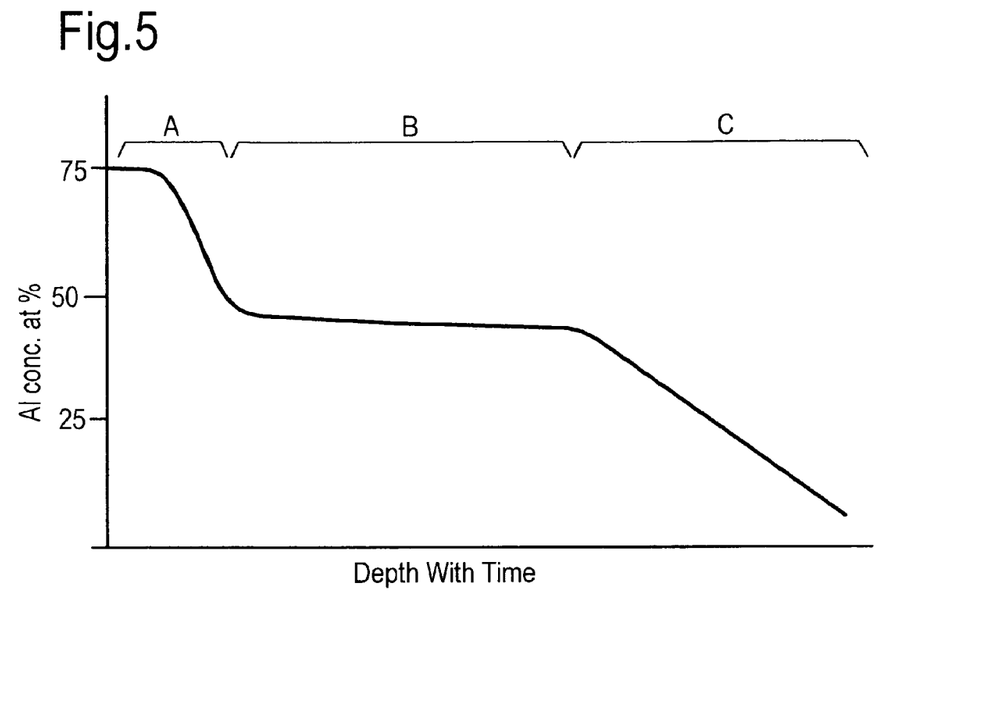
FIG. 5 is a graph of aluminium concentration in a nickel aluminide coating versus depth with time.

FIG. 5 shows a graph of aluminium concentration of a nickel aluminide coating on a gas turbine engine component versus depth with time. The graph shows that during service of a gas turbine engine component the concentration of aluminium changes. Initially in region A the concentration of aluminium may be up to 75 at % at the surface of the nickel aluminide coating, but this much aluminium makes the nickel aluminide coating brittle. The concentration of aluminium reduces at a relatively fast rate with time in region A to reach region B. In region A the aluminium diffuses from the nickel aluminide coating to the substrate of the gas turbine engine component. In region B chemically stable beta nickel aluminide coating forms, but aluminium again diffuses relatively slowly from the nickel aluminide coating to the substrate of the gas turbine engine component and the concentration of aluminium reduces relatively slowly. The concentration of aluminium reduces at a relatively fast rate with time in region C as aluminium diffuses from the nickel aluminide coating to the substrate of the gas turbine engine component. The aluminium in the nickel aluminide coating in region B acts as a reservoir of aluminium to provide the corrosion protection of the nickel aluminide coating. However, there must be a useful depth of the nickel aluminide coating. A problem arises when it is necessary to repair a nickel aluminide coating in that the thickness of the nickel aluminide coating is not known and the composition of the nickel aluminide coating is not known, the position of the nickel aluminide coating relative to FIG. 5 is not known, e.g. whether the nickel aluminide coating is in region B or region C or if the nickel aluminide coating is in region B the position in region B.

Figure 6:
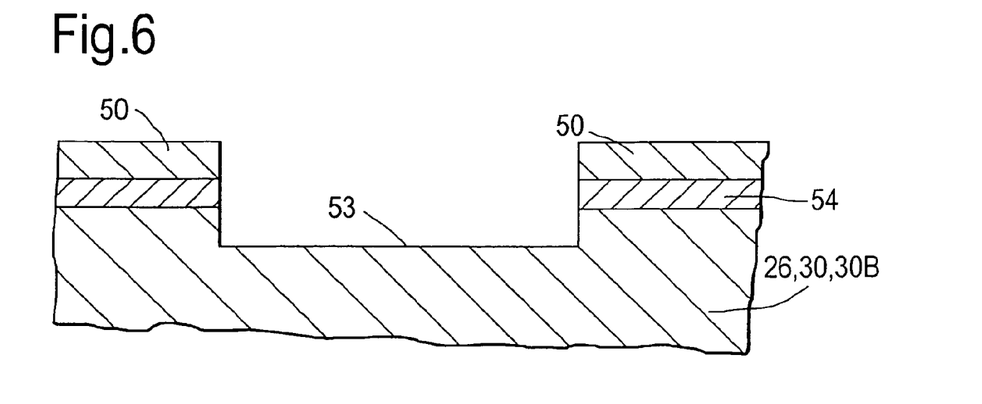
FIG. 6 is a cross-sectional view through a nickel aluminide coating after removal of a damaged portion of the nickel aluminide coating.
Figure 7:
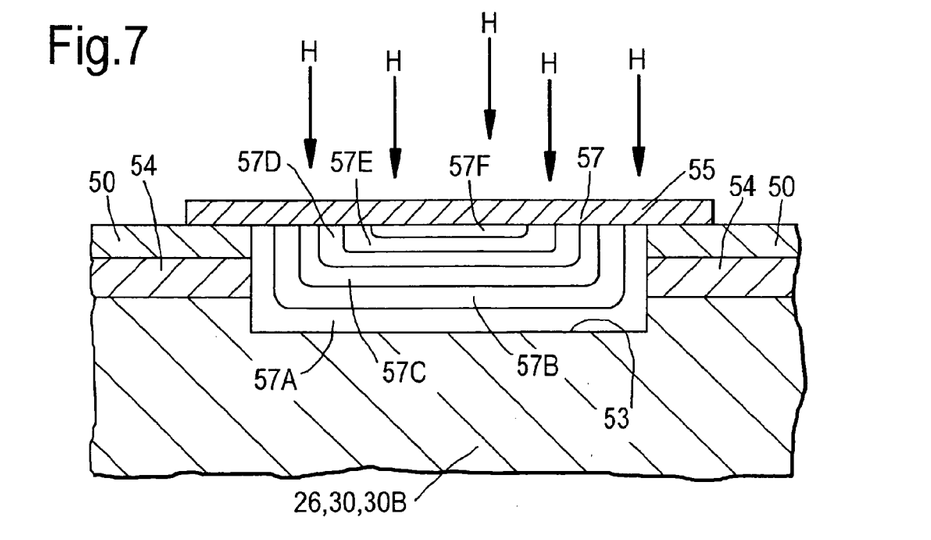
FIG. 7 is a cross-sectional view through a nickel aluminide coating after removal of a damaged portion of the nickel aluminide coating and a nickel aluminide foil for repairing the portion of the nickel aluminide coating.
Figure 8:
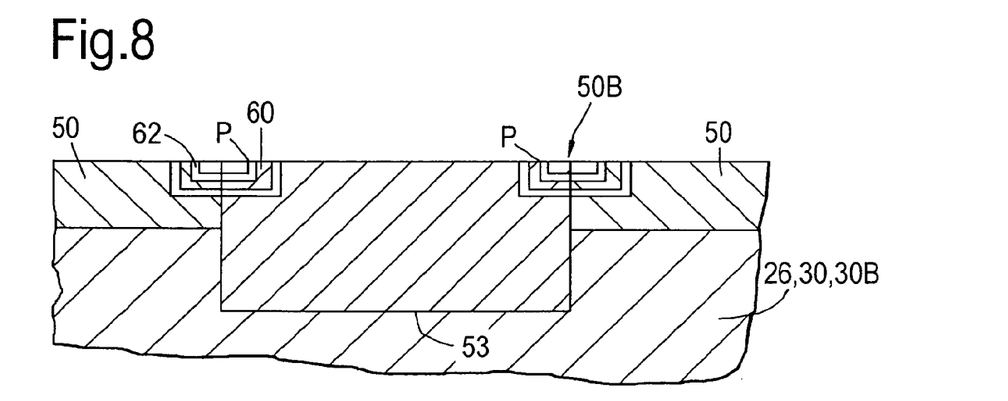
FIG. 8 is a cross-sectional view through a nickel aluminide coating and a repaired portion of the nickel aluminide coating showing stitching of an interface between the nickel aluminide coating and the repaired portion of the nickel aluminide coating.

In order to locally repair the damaged portion 52 of the nickel aluminide coating 50 on the nozzle guide vane 26, or the turbine blade 30 or 30B, the following method, as illustrated in FIGS. 6 to 10, is used. Initially the damaged portion 52 of the nickel aluminide coating 50 is removed from a portion 53 of the surface of the nozzle guide vane 26, or the turbine blade 30 or 30B, as shown in FIG. 6. Any oxidised layer 54 is then removed from the portion 53 of the surface of the nozzle guide vane 26, or the turbine blade 30 or 30B, as shown in FIG. 6. It is to be noted that part of the substrate is removed from the portion 53 of the surface of the nozzle guide vane 26, or turbine blade 30 or 30B. Then stoichiometric amounts of nickel and aluminium 55 are placed on the portion 53 of the surface of the nozzle guide vane 26, or turbine blade 30 or 30B, as shown in FIG. 7. Then stoichiometric amounts of nickel and aluminium 55 are heat treated to form a nickel aluminide patch coating 50B on the portion 53 of the surface of the nozzle guide vane 26, or turbine blade 30 or 30B, and to bond the nickel aluminide patch coating 50B to the portion 53 of the surface of the nozzle guide vane 26, or turbine blade 30 or 30B, and to the nickel aluminide coating 50 adjacent to, or in some cases, surrounding the portion 53 of the surface of the nozzle guide vane 26, or turbine blade 30 or 30B, as shown in FIG. 8.

It may be necessary to remove any excess nickel aluminide patch coating 50B from the portion of the nozzle guide vane 26, or turbine blade 30 or 30B, if the repaired nickel aluminide patch coating 50B stands proud from the surface of the undamaged nickel aluminide coating 50 in order to regain an aerodynamic profile. The excess nickel aluminide patch coating 50B is removed by mechanical machining, e.g. grinding, or chemical machining, e.g. etching with an acid, electrochemical machining using an electrolyte and the electrolyte may be an acid. The mechanical machining, chemical machining or electro-chemical machining may involve the use of agitation.

As shown in FIG. 6 the thickness of the nickel aluminide coating 50 may be up to 200 micrometers, the thickness of the oxide layer 54 may be up to 200 micrometers and the thickness of the nickel aluminide patch coating 50B may be up to 500 micrometers.

The stoichiometric amounts of nickel and aluminium may be placed on the portion 53 of the surface of the nozzle guide vane 26, or turbine blade 30 or 30B, by supplying and placing a mixture of nickel and aluminium powders, or particles. Alternatively the stoichiometric amounts of nickel and aluminium may be placed on the portion 53 of the surface of the nozzle guide vane 26, or turbine blade 30 or 30B, by supplying and placing nickel aluminide powder, or particles, on the portion 53 of the nozzle guide vane 26, or turbine blade 30 or 30B.

Alternatively, as shown in FIG. 7, the stoichiometric amounts of nickel and aluminium 55 are placed on the portion 53 of the surface of the nozzle guide vane 26, or turbine blade 30 or 30B, by placing at least one foil 57 on the portion 53 of the surface of the gas turbine engine component 26, 30 or 30B. The foil 57 comprises either pre-sintered nickel aluminide powder, or particles, or pre-sintered nickel and aluminium powder, or particles.

The foil 57 is placed on the portion 53 of the surface of the gas turbine engine component 26, 30 or 30B by blowing the at least one foil 57 onto the portion 53 of the surface of the gas turbine engine component 26, 30 or 30B. It may be necessary to place a first foil 57 onto the portion 53 of the surface of the gas turbine engine component 26, 30 or 30B and placing at least one further foil 57 onto the first foil 57. It may be necessary to place a plurality of further foils 57B to 57F onto the first foil 57A and each further foil 57B to 57F is placed on a preceding foil 57 in order to build up the required thickness of nickel aluminide patch coating 50B. The number of foils 57 required depends upon the thickness of the foils 57 and the required thickness of the nickel aluminide patch coating 50B. It may be necessary to heat the foils 57 to aid the blowing of the foils 57 onto the portion 53 of the surface of the nozzle guide vane 26, or turbine blade 30 or 30B, and in particular hot gas is arranged to impinge upon the foil 57 to heat it and to form it against the portion 53 of the surface of the nozzle guide vane 26, or turbine blade 30 or 30B. The edges of the foil 57 are held against the nickel aluminide coating 50. In particular FIG. 7 shows hot gas jets H impinging on the foil 57 to heat it and to blow it onto the portion 53 of the surface of the nozzle guide vane 26, or turbine blade 30 or 30B. The hot gas jets H are provided by a heating device which comprises an enclosure which extends over the portion 53 to be repaired. The enclosure is made from steel or ceramic and the enclosure comprises nozzles to direct hot gas jets H onto the foil 57. The hot gas jets may be argon or other inert gas. The heating device locally heats the portion 53 to be repaired.

The stoichiometric amounts of nickel and aluminium are heat treated using the heating device which provides hot gases jets H over the portion 53 to be repaired. The heating device locally heats the portion 53 to be repaired. The hot gas jets H sinter, consolidate and bond the nickel and aluminium to form the nickel aluminide patch coating 50B on the portion 53 to be repaired. The hot gas jets H provide impulses of heat into the surface of the nozzle guide vane 26 or turbine blade 30 or 30B. The hot gas jets H provide known quantities of gas, with known impulses of heat at a known rate into the surface of the nozzle guide vane 26 or turbine blade 30 or 30B to control the depth of heating into the surface of the nozzle guide vane 26 or turbine blade 30, 30B. This provides a shallow heating pattern, with temperature monitoring and sintering with validation parameters. The sintering may be at a temperature of about 1000° C. to 1200° C. for 1 to 6 hours and at a pressure of 4 to 5 bars, 0.4 to 0.5 MPa.

Figure 9:
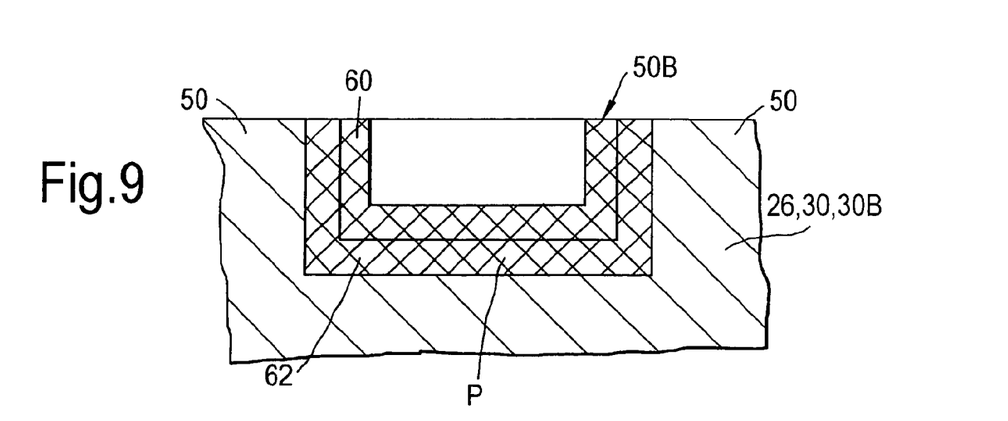
FIG. 9 is plan view of the nickel aluminide coating and the repaired portion of the nickel aluminide coating showing stitching of the interface between the nickel aluminide coating and the repaired portion of the nickel aluminide coating.

Following consolidation and sintering a laser beam, or other high energy beam, is directed to impinge upon the periphery 60 of the nickel aluminide patch coating 50B and to move to the periphery 62 of the nickel aluminide coating 50 adjacent to, or surrounding, the nickel aluminide patch coating 50B. The laser beam, or other high energy beam, is moved in a zig-zag pattern, or a cross-hatched pattern, P from the periphery 60 of the nickel aluminide patch coating 60 to the periphery 62 of the nickel aluminide coating 50 adjacent to, or surrounding, the nickel aluminide patch coating 50B and back throughout the full peripheries 60 and 62 of the nickel aluminide patch coating 50B and the nickel aluminide coating 50. Preferably there are up to five passes of the laser beam at each position on the peripheries 60 and 62. The laser beam, or other high energy beam, is moved in a pattern P such that the whole of the periphery of the nickel aluminide patch coating 50B and the whole of the periphery of the nickel aluminide coating 50 adjacent to, or surrounding the nickel aluminide patch coating 50B are heated uniformly to the same degree, or by the same amount. Thus, the laser beam, or other high energy beam, produces repeatable process conditions to heat the whole of the periphery of the nickel aluminide patch coating 50B and the whole of the periphery of the nickel aluminide coating 50 adjacent to, or surround, the nickel aluminide patch coating 50B uniformly to the same degree, or by the same amount. The laser beam may be a pulsed laser beam which is pulsed at each point in its path or alternatively may be a continuous laser beam.

A melting point depressant may be provided with the stoichiometric amounts of nickel and aluminium in order to aid sintering of the nickel and aluminium powder, or particles or the nickel aluminide powder or particles. The melting point depressant may be boron or copper. The melting point depressant may be provided as a coating on the powder, or particles, preferably by sputtering.

The nickel aluminide powder, or particles, may be provided with a halogen salt flux coating, preferably by sputtering.

As mentioned here the stoichiometric amounts of nickel and aluminium means the amounts of nickel and aluminium required to produce beta nickel aluminide, NiAl. These stoichiometric amounts, or proportions, of nickel and aluminium provided are broadly 40 to 60 at % nickel and 60 to 40 at % aluminium, more preferably 45 to 55 at % nickel and 55 to 45 at % aluminium in particular 50 at % nickel and 50 at % aluminium, or 69 wt % nickel and 31 wt % aluminium, to produce NiAl. Thus amounts of nickel and aluminium powder, or particles, are provided accordingly or nickel aluminide is prepared with these proportions of nickel and aluminium.

A thin layer of nickel, and/or cobalt, up to 50 micrometers, may be provided to give inter-diffusion, on the portion of the surface of the gas turbine engine component prior to placing the stoichiometric amounts of nickel and aluminium to assist consolidation of the nickel aluminide patch coating. A thin layer, up to 50 micrometers, of aluminium may be provided on the portion of the surface of the gas turbine engine component prior to placing the stoichiometric amounts of nickel and aluminium to assist consolidation of the nickel aluminide patch coating.

The damaged portion 52 of the nickel aluminide coating 50 is removed by mechanical machining, e.g. by grinding, or chemical stripping, e.g. etching with an acid, electro-chemical machining using an electrolyte and the electrolyte may be an acid. The mechanical machining, chemical machining or electro-chemical machining may involve the use of agitation. The oxide layer 54 is removed by mechanical machining, e.g. grinding.

The nickel aluminide coating 50 may be provided with a mask before the damaged portion 52 is removed.

It may be possible to add small amounts of yttrium and/or lanthanum to the stoichiometric amounts of nickel and aluminium to increase oxidation resistance. It may be possible to add chromium and silicon to increase oxidation and/or corrosion resistance.

The advantage of the present invention is that because the required stoichiometric amounts of nickel and aluminium are provided as powder, or particles, or as nickel aluminide the time required for heat treatment, diffusion, is reduced. Additionally, because the required stoichiometric amounts of nickel and aluminium are provided as powder, or particles, or as nickel aluminide the concentration of aluminium in the original nickel aluminide coating 50 would not increase and change it to the brittle phase $NiAl_3$, the original undamaged nickel aluminide coating will not have a "halo" or "ring" with a high concentration of aluminium. Also, the stoichiometric amounts of nickel and aluminium provide optimum oxidation resistance. The use of nickel and aluminium powders may be metered to control the thickness and composition of the nickel aluminide coating. The use of nickel aluminide powder may be metered to control the thickness of the nickel aluminide coating. It may be possible to dispense with the requirement to solution heat treat the gas turbine engine component following repair of the nickel aluminide coating.

The present invention has been described with reference to a simple nickel aluminide coating which is repaired with stoichiometric amounts of nickel and aluminium. The present invention is also applicable to the repair of more complex aluminide coatings such as platinum aluminide coatings, chromium aluminide coatings or silicon aluminide coatings. In the case of a platinum aluminide coating the repair would involve the use of stoichiometric amounts of nickel, platinum and aluminium again in the form of nickel, platinum and aluminium powders, beta platinum aluminide powder, foil of pre-sintered nickel, platinum and aluminium powders or a foil of pre-sintered beta platinum aluminide powder.

These stoichiometric amounts, or proportions, of nickel, platinum and aluminium provided for a beta platinum aluminide are broadly more than 0 at % up to 30 at % nickel, 50 to 20 at % platinum and 40 to 60 at % aluminium, more preferably more than 0 at % up to 25 at % nickel, 25 to 50 at % platinum and 44 to 55 at % aluminium. In particular the preferred composition is 25 at % nickel, 25 at % platinum and 50 at % aluminium, or 19 wt % nickel, 63.5 wt % platinum and 17.5 wt % aluminium. A further composition is 30 at % nickel, 30 at % platinum and 40 at % aluminium. Another composition is 20 at % nickel, 20 at % platinum and 60 at % aluminium. Thus amounts of nickel, platinum and aluminium powder, or particles, are provided accordingly or nickel/platinum aluminide is prepared with these proportions of nickel, platinum and aluminium.

The present invention is also applicable to the repair of other coatings e.g. MCrAlY coatings, where M is one or more of Fe, Co or Ni, or abrasive coatings comprising cubic boron nitride, silicon nitride, silicon carbide, alumina or diamond grits in a metal matrix of cobalt or MCrAlY or wear resistant coatings comprising chromium carbide etc.

Although the present invention has been described with reference to repairing coatings on gas turbine engine components, the present invention is also applicable to repairing coatings on other component or articles.

The invention claimed is:

1. A method of locally repairing a coating on an article comprising the steps of:
   a) removing a damaged portion of the coating from a portion of the article,
   b) removing any oxidized layer from the portion of the article,
   c) placing the material on the portion of the article,
   d) heat treating the material to form a patch coating on the portion of the article and to bond the patch coating to the portion of the article and to the coating adjacent to the patch coating, and
   e) impinging an energy beam on the coating or the patch coating and moving the energy beam from a periphery of the patch coating to a periphery of the coating adjacent to the patch coating and back in a zig-zag pattern or moving the energy beam from the periphery of the patch coating to the periphery of the coating adjacent to the patch coating to form a cross-hatch pattern, to uniformly heat the periphery of the patch coating and the periphery of the coating adjacent to the patch coating; wherein the coating is selected from the group consisting of nickel aluminide coating, a platinum aluminide coating, a chromium aluminide coating, a silicon aluminide coating, and a MCrAlY coating, wherein M is one or more of Fe, Co and Ni.

2. A method as claimed in claim 1 wherein the energy beam is a laser beam.

3. A method as claimed in claim 1 wherein the coating comprises nickel aluminide and step c) comprises placing stoichiometric amounts of nickel and aluminium only on the portion of the article.

4. A method as claimed in claim 3 wherein step c) comprises placing stoichiometric amounts of nickel powder and aluminium powder on the portion of the article.

5. A method as claimed in claim 3 wherein step c) comprises placing nickel aluminide powder on the portion of the article.

6. A method as claimed in claim 3 wherein step c) comprises placing at least one foil onto the portion of the article, the foil comprising a pre-sintered powder, the pre-sintered powder is selected from the group comprising pre-sintered nickel aluminide powder and pre-sintered nickel and aluminium powders.

7. A method as claimed in claim 1 wherein the coating comprises platinum aluminide and step c) comprises placing stoichiometric amounts of platinum, nickel and aluminium to produce a platinum aluminide patch coating.

8. A method as claimed in claim 7 wherein step c) comprises placing stoichiometric amounts of platinum powder, nickel powder and aluminium powder on the portion of the article.

9. A method as claimed in claim 7 wherein step c) comprises placing platinum aluminide powder on the portion of the article.

10. A method as claimed in claim 7 wherein step c) comprises placing at least one foil onto the portion of the article, the foil comprising a pre-sintered powder, the pre-sintered powder is selected from the group comprising pre-sintered platinum aluminide powder and pre-sintered platinum, nickel and aluminium powders.

11. A method as claimed in claim 6 wherein step c) comprises blowing the at least one foil onto the portion of the article.

12. A method as claimed in claim 11 wherein step c) comprises placing a first foil onto the portion of the article and placing at least one further foil onto the first foil.

13. A method as claimed in claim 10 wherein step c) comprises blowing the at least one foil onto the portion of the article.

14. A method as claimed in claim 13 wherein step c) comprises placing a first foil onto the portion of the article and placing at least one further foil onto the first foil.

15. A method as claimed in claim 1 wherein step d) comprises locally heat treating the material to form the patch coating on the portion of the article and to bond the patch coating to the portion of the article and to the coating adjacent to the patch coating.

16. A method as claimed in claim 15 wherein locally heat treating comprises providing an enclosure which extends over the portion of the article, through nozzles in the enclosure directing hot gas jets onto the portion of the article.

17. A method as claimed in claim 1 wherein the article comprises a gas turbine engine component.

18. A method as claimed in claim 17 wherein the gas turbine engine component is selected from the group comprising a turbine vane, a turbine blade, a combustor nozzle guide vane and a turbine blisk.

19. A method of locally repairing a nickel aluminide coating on an article comprising the steps of:
   a) removing a damaged portion of the nickel aluminide coating from a portion of the article,
   b) removing any oxidized layer from the portion of the article,
   c) placing stoichiometric amounts of only nickel and aluminium on the portion of the article,
   d) heat treating the stoichiometric amounts of nickel and aluminium to form a nickel aluminide patch coating on the portion of the article and to bond the nickel aluminide patch coating to the portion of the article and to a portion of the nickel aluminide coating adjacent to the nickel aluminide patch coating, and
   e) the portion of the nickel aluminide coating adjacent to the nickel aluminide patch coating having a periphery, the nickel aluminide patch coating having a periphery, impinging an energy beam on one of the nickel aluminide coating or the nickel aluminide patch coating and moving the energy beam between the periphery of the nickel aluminide patch coating and the periphery of the nickel aluminide coating adjacent to the nickel aluminide patch coating and back in a zig-zag pattern or moving the energy beam from the periphery of the nickel aluminide patch coating to the periphery of the nickel aluminide coating adjacent to the nickel aluminide patch coating to form a cross-hatch pattern, to uniformly heat the periphery of the nickel aluminide patch coating and the periphery of the nickel aluminide coating adjacent to the nickel aluminide patch coating.

20. A method as claimed in claim 19 wherein step d) comprises sintering, consolidating and bonding the nickel and aluminium patch coating to form the nickel aluminide patch coating.

21. A method as claimed in claim 1 wherein step d) comprises sintering at a temperature of 1,000° C. to 1,200° C.

22. A method as claimed in claim 11 wherein step c) comprises impinging hot gas upon the at least one foil to heat the at least one foil, to blow the at least one foil onto the portion of the article and to form the at least one foil against the portion of the article.

23. A method as claimed in claim 22 wherein step c) comprises holding the edges of the at least one foil against the periphery of the coating.

24. A method as claimed in claim 22 wherein step c) comprises providing an enclosure which extends over the portion of the article, through nozzles in the enclosure, directing hot gas jets onto the at least one foil and portion of the article.

25. A method as claimed in claim 16 wherein in step d) the hot gas jets provide known quantities of hot gas with known quantities of heat at a known rate onto the portion of the article to control the depth of heating into the article.

26. A method of locally repairing a nickel aluminide coating on an article comprising the steps of:
   a) removing a damaged portion of the nickel aluminide coating from a portion of the article,
   b) removing any oxidized layer from the portion of the article,
   c) placing material consisting of stoichiometric amounts of only nickel and aluminium on the portion of the article to produce a nickel aluminide patch coating on the portion of the article,
   d) locally heat treating the stoichiometric amounts of nickel and aluminium to form a nickel aluminide patch coating on the portion of the article and to bond the nickel aluminide patch coating to the portion of the article and to a portion of the nickel aluminide coating adjacent to the nickel aluminide patch coating, the local heat treating comprising sintering, consolidating and bonding the nickel aluminide patch coating to form the nickel aluminide patch coating, the local heat treating comprising providing an enclosure which extends over the portion of the article, directing hot gas jets through nozzles in the enclosure onto the portion of the article, the hot gas jets providing known quantities of hot gas with known quantities of heat at a known rate on the portion of the article to control the depth of heating into the article, and e) the portion of the nickel aluminide coating adjacent to the nickel aluminide patch coating having a periphery, the nickel aluminide patch coating having a periphery, impinging an energy beam on one of the nickel aluminide coating or the nickel aluminide patch coating and moving the energy beam between the periphery of the nickel aluminide patch coating and the periphery of the nickel aluminide coating adjacent to the nickel aluminide patch coating and back in a zig-zag pattern or moving the energy beam from the periphery of the nickel aluminide patch coating to the periphery of the nickel aluminide coating adjacent to the nickel aluminide patch coating to form a cross-hatch pattern, to uniformly heat the periphery of the nickel aluminide patch coating and the periphery of the nickel aluminide coating adjacent to the nickel aluminide patch coating.

* * * * *